(12) United States Patent
Kotary et al.

(10) Patent No.: US 12,572,410 B2
(45) Date of Patent: Mar. 10, 2026

(54) LIVE MEMORY RECOVERY USING A PLUGGABLE MEMORY MODULE

(71) Applicant: Microsoft Technology Licensing, LLC, Redmond, WA (US)

(72) Inventors: Karunakara Kotary, Vancouver, WA (US); Ankur Garg, Vancouver, WA (US); Venkatesh Ramamurthy, Vancouver, WA (US); Nagasubramanian Gurumoorthy, Leander, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 18/203,564

(22) Filed: May 30, 2023

(65) Prior Publication Data

US 2024/0403157 A1     Dec. 5, 2024

(51) Int. Cl.
*G06F 11/07*     (2006.01)
*G06F 9/455*     (2018.01)

(52) U.S. Cl.
CPC ...... *G06F 11/0793* (2013.01); *G06F 9/45558* (2013.01); *G06F 11/073* (2013.01); *G06F 2009/45583* (2013.01); *G06F 2009/45591* (2013.01)

(58) Field of Classification Search
CPC .............. G06F 11/0793; G06F 11/073; G06F 9/45558
See application file for complete search history.

(56) References Cited

U.S. PATENT DOCUMENTS

| | | | | |
|---|---|---|---|---|
| 4,559,596 A | * | 12/1985 | Ohnishi | .............. G06F 11/0766 |
| | | | | 712/228 |
| 10,353,790 B1 | * | 7/2019 | Rangaiah | .............. G06F 11/263 |
| 2002/0018354 A1 | | 2/2002 | Chih-Hung | |
| 2009/0217093 A1 | * | 8/2009 | Co | ......................... G11C 29/56 |
| | | | | 714/E11.02 |

(Continued)

OTHER PUBLICATIONS

Du, et al., "A Rising Tide Lifts All Boats", USENIX, The Advanced Computing Systems Association, Sep. 13, 2010, 6 pages.

(Continued)

*Primary Examiner* — Kamini B Patel
(74) *Attorney, Agent, or Firm* — Schwegman Lundberg & Woessner, P.A.

(57)     ABSTRACT

Systems and techniques for live memory recovery using a pluggable memory module are described herein. It may be detected that a spare memory module has been inserted into a computing device based on a signal transmitted from the spare memory module. The spare memory module may be initialized. A dynamic random-access memory (DRAM) module of the computing device may be identified that is predicted to fail. Freeze instructions may be transmitted to a virtual machine manager to pause virtual machines executing on the computing device. Memory data may be transferred from the DRAM module to the spare memory module. Memory addresses may be remapped from the DRAM module to the spare memory module. Unfreeze instructions may be transmitted to the virtual machine manager to resume the virtual machines executing on the computing device.

20 Claims, 6 Drawing Sheets

(56)     References Cited

U.S. PATENT DOCUMENTS

| 2009/0217102 | A1* | 8/2009 | Co | ................... | G11C 29/56016 |
| | | | | | 714/42 |
| 2010/0162037 | A1* | 6/2010 | Maule | ................... | G06F 11/106 |
| | | | | | 711/E12.001 |
| 2011/0213915 | A1* | 9/2011 | So | ......................... | G06F 3/0679 |
| | | | | | 711/E12.008 |
| 2017/0372799 | A1* | 12/2017 | Bacchus | ................ | G11C 29/42 |
| 2018/0357137 | A1 | 12/2018 | Gupta | | |
| 2020/0142824 | A1* | 5/2020 | Koladi | ................ | G06F 11/1666 |
| 2022/0171686 | A1* | 6/2022 | Nakajima | ........... | G06F 11/2094 |
| 2022/0179724 | A1* | 6/2022 | Shim | ................... | G06F 11/3055 |

OTHER PUBLICATIONS

Invitation to Pay Additional Fees And, Where Applicable, Protest Fee received for PCT Application No. PCT/US2024/030153, mailed on Sep. 25, 2024, 08 pages.

International Search Report and Written Opinion received for PCT Application No. PCT/US2024/030153, mailed on Nov. 15, 2024, 25 pages.

International Preliminary Report on Patentability (Chapter I) received for PCT Application No. PCT/US2024/030153, mailed on Dec. 11, 2025, 16 pages.

* cited by examiner

300

305
RECEIVE REPLACEMENT INITIATION

310
INITIALIZE MEMORY

315
TRANSMIT FREEZE REQUEST

320
COPY DATA FROM CSPMM TO MEMORY

325
SHUTDOWN CSPMM

330
TRANSMIT UNFREEZE REQUEST

335
UPDATE MEMORY TELEMETRY

*500*

505
RECEIVE MEMORY REPLACEMENT REQUEST

510
TRANSMIT TRAINING DATA REPROGRAM REQUEST

515
INITIALIZE REPLACEMENT DRAM

520
TRANSMIT FREEZE INSTRUCTIONS

525
TRANSFER MEMORY DATA

530
REMAP MEMORY ADDRESSES

535
TRANSMIT UNFREEZE INSTRUCTIONS

LIVE MEMORY RECOVERY USING A PLUGGABLE MEMORY MODULE

TECHNICAL FIELD

Embodiments described herein generally relate to computer memory management and, in some embodiments, more specifically to live replacement of a dynamic random access memory module using a pluggable spare memory module.

BACKGROUND

A cloud computing system is a collection of clusters of computing nodes. The computing nodes execute a virtual machine manager or hypervisor that executes and manages virtual machines that perform computing tasks that may have been performed by conventional stand-alone computing devices. The computing nodes include a variety of computing hardware and software resources that are shared among the virtual machines distributed by the virtual machine manager. The computing hardware may include central processing units, memory, data storage, etc. The computing nodes may include dynamic random access memory (DRAM) modules. The DRAM modules have a finite, but variable time between failure. When a DRAM module fails, it may render the computing node unstable resulting in memory errors. The memory errors may cause a computing node to be placed in an out for repair status preventing the computing node from executing workloads resulting in reduced computing capacity.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
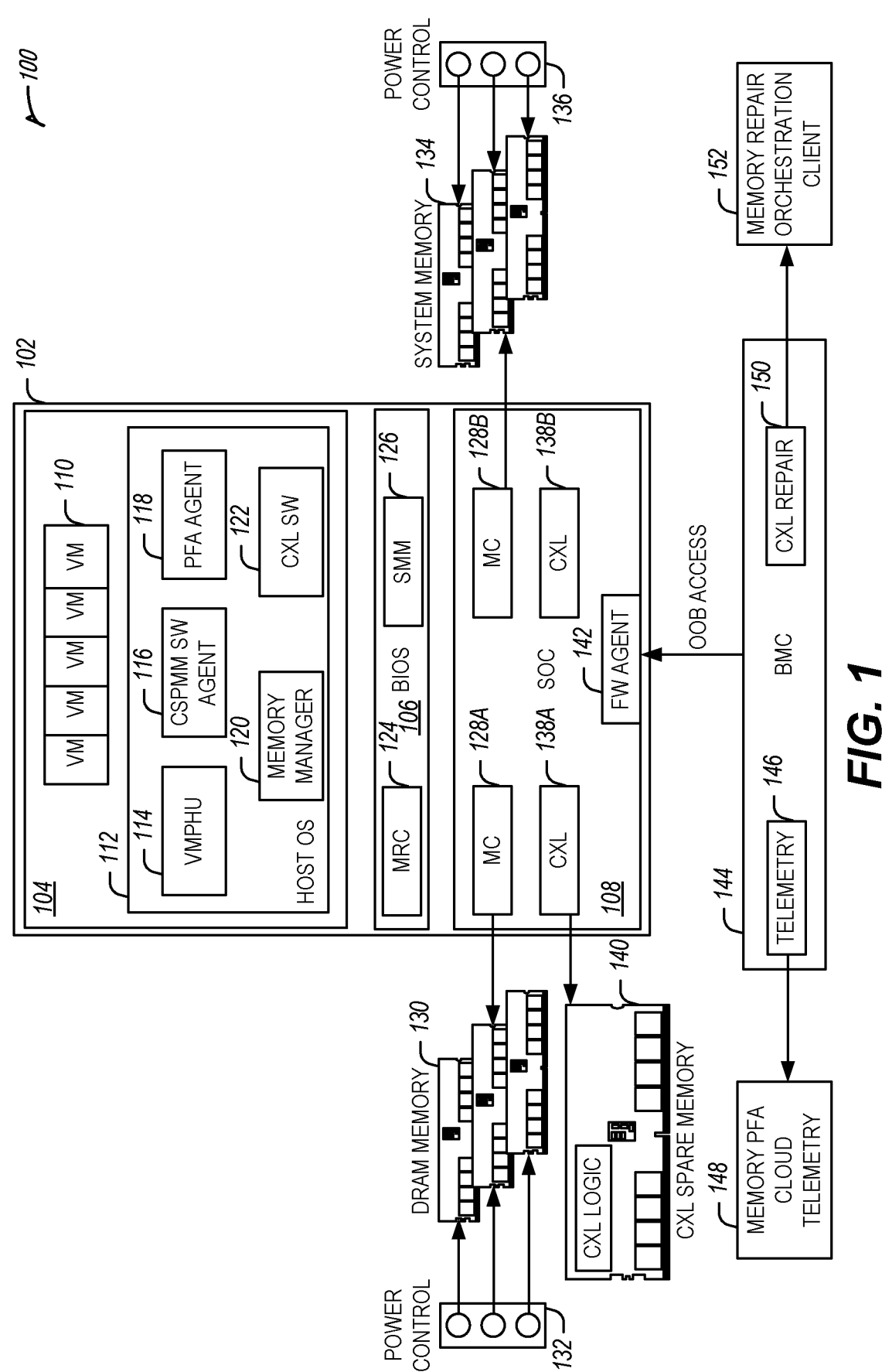
FIG. 1 is a block diagram of an example of a system for live memory recovery using a pluggable memory module, according to an embodiment.

System dynamic random access memory (DRAM) is an expensive commodity in cloud computing systems and reliable system DRAM enables attainment of high system availability (e.g., 99.99%, etc.). High availability may be used to formulate service level agreements (SLA). Predictive failure analysis (PFA) models have improved to a point where potential memory (e.g., dual in-line memory module (DIMM), dynamic random-access memory (DRAM), system memory, etc.) time to failure may be detected with 80% accuracy. With PFA, virtual machines (VMs) running on a system with a predicted memory failure may be migrated to other nodes and the affected node may enter an out for repair (OFR) state so that the faulty memory may be replaced. However, live migration of VMs to another node require excess computing resources and having the node in the OFR state means that the available computing resources of the cloud computing system is reduced until the memory is replaced.

The systems and techniques discussed herein assume an operating system (OS) and hardware (e.g., central processing unit (CPU), input/output (IO) channels, etc.) of a computing node support a quiescing memory traffic capability, that the COMPUTE EXPRESS LINK (CXL) standard by the CXL Consortium offers memory pooling features and also offers runtime addition and removal of memory modules, that data center server memory power delivery is controllable per DRAM module, that the failing DRAM and the replacement DRAM are compatible (e.g., of same vendor, configuration, etc.), and that training data stored on non-volatile random-access memory (NVRAM) is reusable to initialize a newly added memory module. CXL includes a set of protocols that are compatible with the peripheral component interlink express (PCIe) bus standard to manage CPU to IO device and CPU to memory interconnections. Quiescing capability enables memory traffic to be paused and resumed for individual DRAM modules in a memory channel. This allows memory traffic to be either queued or rerouted during a pause initiated to mirror memory from a failing DRAM module to a spare memory module and from the spare memory to a replacement DRAM.

The systems and techniques prevent live migration of VMs due to predicted memory failures and prevent the loss of computing resources place in an OFR state. The systems and techniques discussed herein utilize a CXL Pluggable spare memory module (CPSMM) that includes memory capacity to back up a highest interleaved size of DRAM that is supported on given generation of computing nodes. Similar to the way a spare tire of a car is used when a car tire is punctured, the CPSMM is used to live repair a DRAM module on a computing node that is running virtual machine managers (VMMs) to allow the computing node to continue operation while a failing DRAM module is replaced. The CPSMM is removed when the DRAM module has been replaced and may be used again on the computing node or another computing node in the data center when another DRAM failure is detected. A data center technician may carry the CPSMM to replace a DRAM module that is predicted to fail in the future with a new working DRAM module without interrupting the working VMs. When the DRAM module is successfully replaced, the technician removes the CPSMM.

FIG. 1 is a block diagram of an example of a system 100 for live memory recovery using a pluggable memory module, according to an embodiment. The system 100 may include a computing node 102. The computing node 102 may include a virtual machine manager (VMM) 104 running VMs 110 and a host operating system (OS) 112. The host OS 112 may include a virtual machine preserving host update (VM-PHU) 114, a CXL pluggable spare memory module (CPSMM) software agent 116, a predictive fault analysis (PFA) agent 118, a memory manager 120, and a CXL software component 122.

The computing node 102 may include a basic input output system (BIOS) 106 that may include a memory reference code 124 and a system management module 126. The computing node 102 may include a system on chip (SoC) 108 that may include memory controllers 128A and 128B, CXL channels 138A and 138B, and a firmware agent 142. Memory controller 128A may control DRAM memory 130 with power control 132 having an ability to adjust power to each DRAM module in the DRAM memory 130. Memory controller 128B may include system memory 134 with power control 136 having an ability to adjust power to each system memory module of the system memory 134. A CPSMM 140 may be hot plugged into the CXL channel 138A. The CPSMM 140 includes sufficient memory capacity to mirror the largest interleaved DRAM size operating within the computing node 102. The CPSMM 140 includes a SoC with an instructions set that works in conjunction with the firmware agent 142 in the SoC 104 and the system management module 126 of the BIOS 106 to notify the SoC 104 and the BIOS 106 that the CPSMM 140 has been attached to the system.

A board manageability controller (BMC) 144 may access the firmware agent 142 using out of band access mechanisms. The BMC 144 may include a telemetry component 146 and a CXL repair component 150. The telemetry component 146 may output telemetry data to maintain memory PFA cloud telemetry 148. The CXL repair component 150 may output repair data to a memory repair orchestration client 153. Firmware of the SOC 108 and/or the BMC 144 is updated to include new software elements and data flow. The CSPMM software agent 116 detects DRAM modules that are in need of repair based on information received from the PFA agent 118.

The CSPMM 140 temporarily adds CXL memory to back up a failed memory region and utilizes quiescing capability built into the VMM 104 by temporarily freezing impacted VMs 110 and entering core level idle states on a CPU so that no memory traffic is generated while a copy transfer of the memory from a DRAM module of the DRAM memory 130 to the CSPMM 140 by enabling the memory controller on the SOC 108 to complete direct memory access (DMA). Upon completion of the transfer of data from DRAM module of the DRAM memory 130 to the CSPMM 140, the VMM 104 unfreezes the impacted VMs 110. Meanwhile the CSPMM software agent 116 isolates the faulty DRAM module and enables the Technician to replace it with good DRAM modules. Thus, the computing node continues to operate while the failing DRAM module is replaced.

Figure 2:
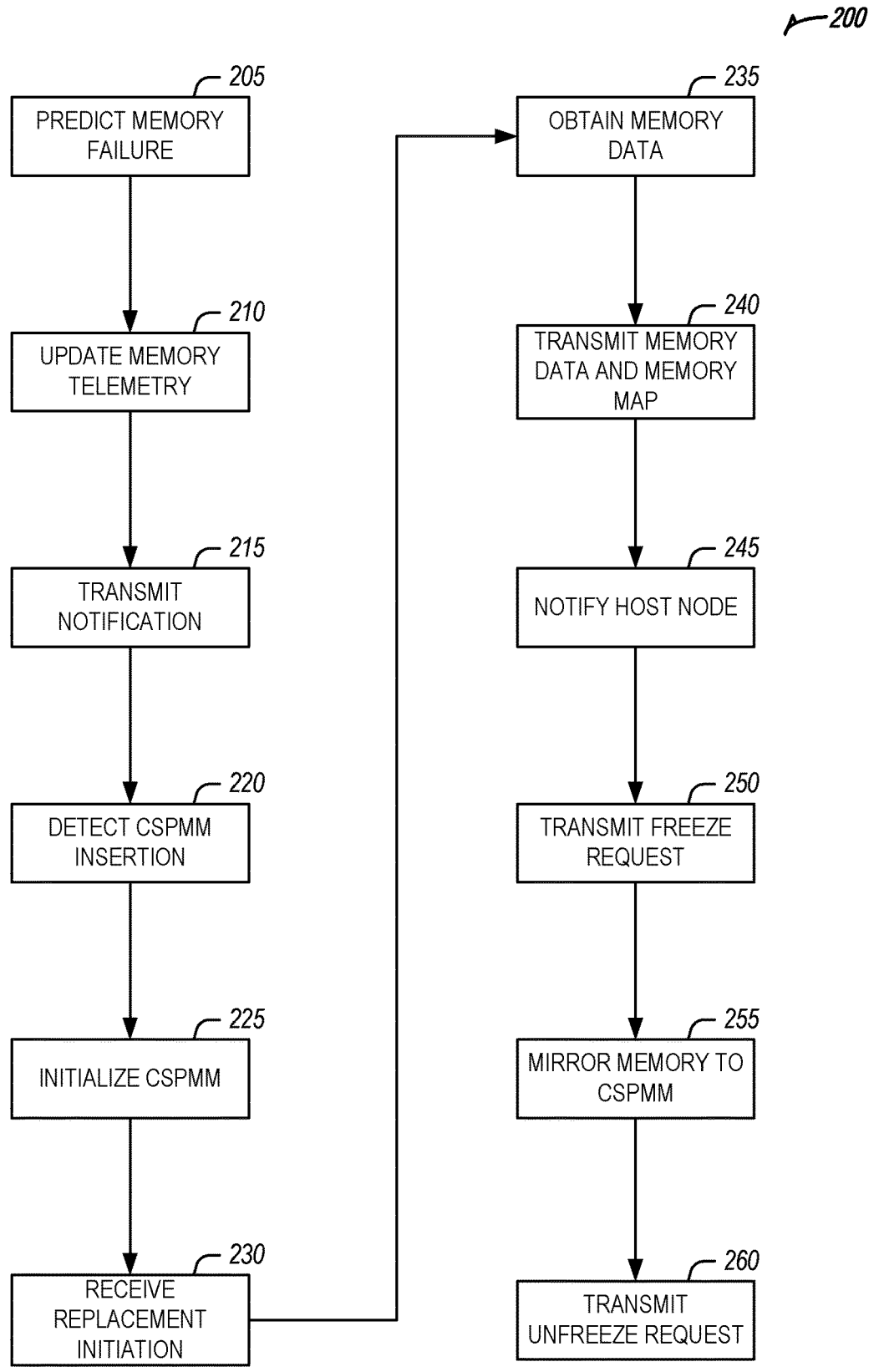
FIG. 2 illustrates a flow diagram of an example of a process for live memory recovery using a pluggable memory module, according to an embodiment.

FIG. 2 illustrates a flow diagram of an example of a process 200 for live memory recovery using a pluggable memory module, according to an embodiment. The process 200 may provide features as described in FIG. 1.

At operation 205, a PFA agent (e.g., the PFA agent 118 as described in FIG. 1, etc.) predicts a failure of a DRAM module (e.g., a DRAM module of the DRAM memory 130 as described in FIG. 1, etc.). For example, PFA agent may receive telemetry data (e.g., error counts, voltage, etc.) for the DRAM module and the telemetry data may be evaluated using a machine learning model to identify a potential failure. At operation 210, a memory PFA telemetry module (e.g., the memory PFA cloud telemetry 148 as described in FIG. 1, etc.) is updated regarding the predicted failure of the DRAM module. At operation 215, the memory PFA telemetry module notifies (e.g., via a text message, email, dashboard alert, etc.) a technician with details of the affected node details and details of a DRAM slot containing the DRAM module.

At operation 220, the technician visits the data center (DC) with the CXL Spare Memory module (e.g., the CSPMM 140 as described in FIG. 1, etc.) and plugs into the system powering on the CSPMM and activating the CXL logic contained withing to notify SOC (e.g., the SOC 108 as described in FIG. 1, etc.) and/or BIOS (e.g., the BIOS 106 as described in FIG. 1, etc.) and a CSPMM software agent (e.g., the CSPMM software agent 116 as described in FIG. 1, etc.) that the CSPMM has been inserted.

At operation 225, CXL software (e.g., the CXL software 122 as described in FIG. 1, etc.) running a host OS (e.g., the host OS 104 as described in FIG. 1, etc.) initializes the CSPMM and makes the memory ready for future usage. At operation 230, a replacement initiation command may be received when the technician uses a memory repair module of an orchestration client (e.g., the memory repair orchestration client 152 as described in FIG. 1, etc.) to initiate live failing DRAM replacement.

At operation 235, a CXL repair agent (e.g., the CXL repair component 150 as described in FIG. 1, etc.) running in a BMC (e.g, the BMC 144 as described in FIG. 1, etc.) receives a repair request from the memory repair module and uses out of band (OOB) access to obtain data for the DRAM that has been predicted to fail and retrieve its interleaved set from an SOC FW Agent (e.g., the firmware agent 142 of the SOC 108 as described in FIG. 1, etc.).

At operation 240, the SOC FW Agent returns the interleaved set socket/channel/slot details and also returns physical memory map details to the CXL repair agent. At operation 245, the CXL repair agent uses the physical memory address details of the failing DRAM module and its interleaved set and notifies the CSPMM software agent running on the host OS.

At operation 250, the CSPMM Software agent transmits a request to a hypervisor (e.g., the VMM 104 as described in FIG. 1, etc.) to freeze impacted VMs (e.g., the VMs 110 as described in FIG. 1, etc.), put the core and IOs in an idle/quiesce state and not generate memory traffic. At operation 255, the CSPMM Software agent initiates an SOC memory controller (e.g., the memory controller 128A as described in FIG. 1, etc.) to begin mirroring and copying of all the data contents from the failing DRAM transferring its interleaved set to the CSPMM.

At operation 260, when the data copy is completed, the CSPMM software agent transmits commands to the SOC/BIOS and hypervisor to unfreeze the VMs that were impacted. The computing node continues to operate while the memory is mirrored from the failing DRAM module to the CSPMM without placing the computing node in an OFR mode (e.g., offline and unavailable for workloads, etc.) and preventing the need for a live migration of a VM from the computing node to another computing node.

Figure 3:
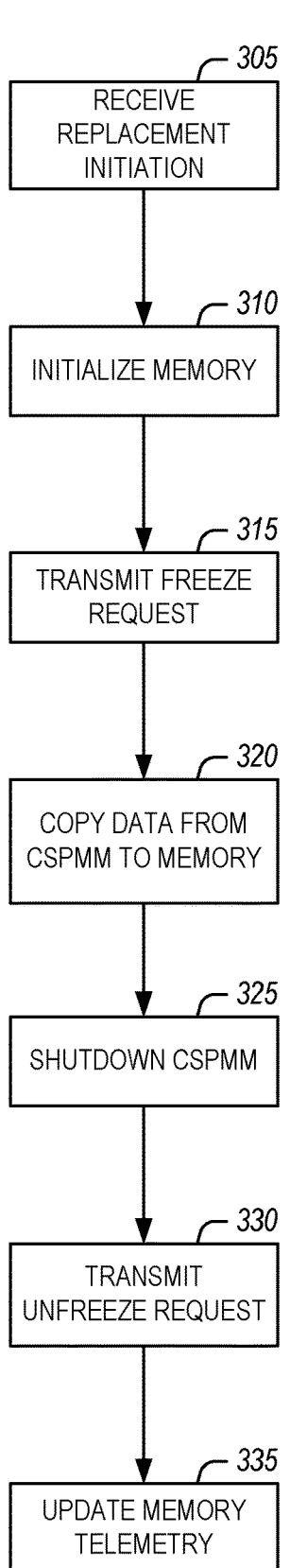
FIG. 3 illustrates a flow diagram of an example of a process for live memory recovery using a pluggable memory module, according to an embodiment.

FIG. 3 illustrates a flow diagram of an example of a process 300 for live memory recovery using a pluggable memory module, according to an embodiment. The process 300 may provide features as described in FIG. 1.

At operation 305, replacement initiation is received when a technician powers off a DRAM module predicted to fail and the interleaved DRAM modules, replaces the failing DRAM module with a DRAM Module with similar properties, powers up the newly replaced DRAM Module and the interleaved set, and initiates a request to a CXL repair agent (e.g., the CXL repair component 150 as described in FIG. 1, etc.) to online the DRAM module.

At operation 310, the new DRAM module is initialized when the CXL repair agent transmits a request to an SOC FW agent (e.g., the firmware 142 as described in FIG. 1, etc.)

to reprogram DRAM memory training data that is prestored in a nonvolatile memory to the replacement DRAM module and interleaved set and requests a CSPMM software agent (e.g., the CSPMM software agent 116 as described in FIG. 1, etc.) to online the replacement DRAM.

At operation 315, the CSPMM software agent transmits a request to a hypervisor (e.g., the VMM 104 as described in FIG. 1, etc.) to freeze impacted VMs (e.g., the VMs 110 as described in FIG. 1, etc.). At operation 320, all the data contents are copied from a CSPMM (e.g., the CSPMM 140 as described in FIG. 1, etc.) to the replacement DRAM and its interleaved set.

At operation 325, when the memory copy is completed, the CSPMM software agent transmits a request to CXL software (e.g., e.g., the CSL software 122 as described in FIG. 1, etc.) to remove the CXL memory mirroring. The CSPMM may shutdown the CSPMM to put the CSPMM in a removal state for removal by the technician.

At operation 330, the CSPMM software agent transmits a request to the hypervisor to unfreeze the impacted VMs. The CSPMM software agent signals the CXL repair agent that the CSPMM has been removed. The technician removes the CSPMM and the live repair of the failing DRAM module is completed without live migration. At operation 335, memory telemetry is updated to reflect that the DRAM module is operating properly.

Figure 4:
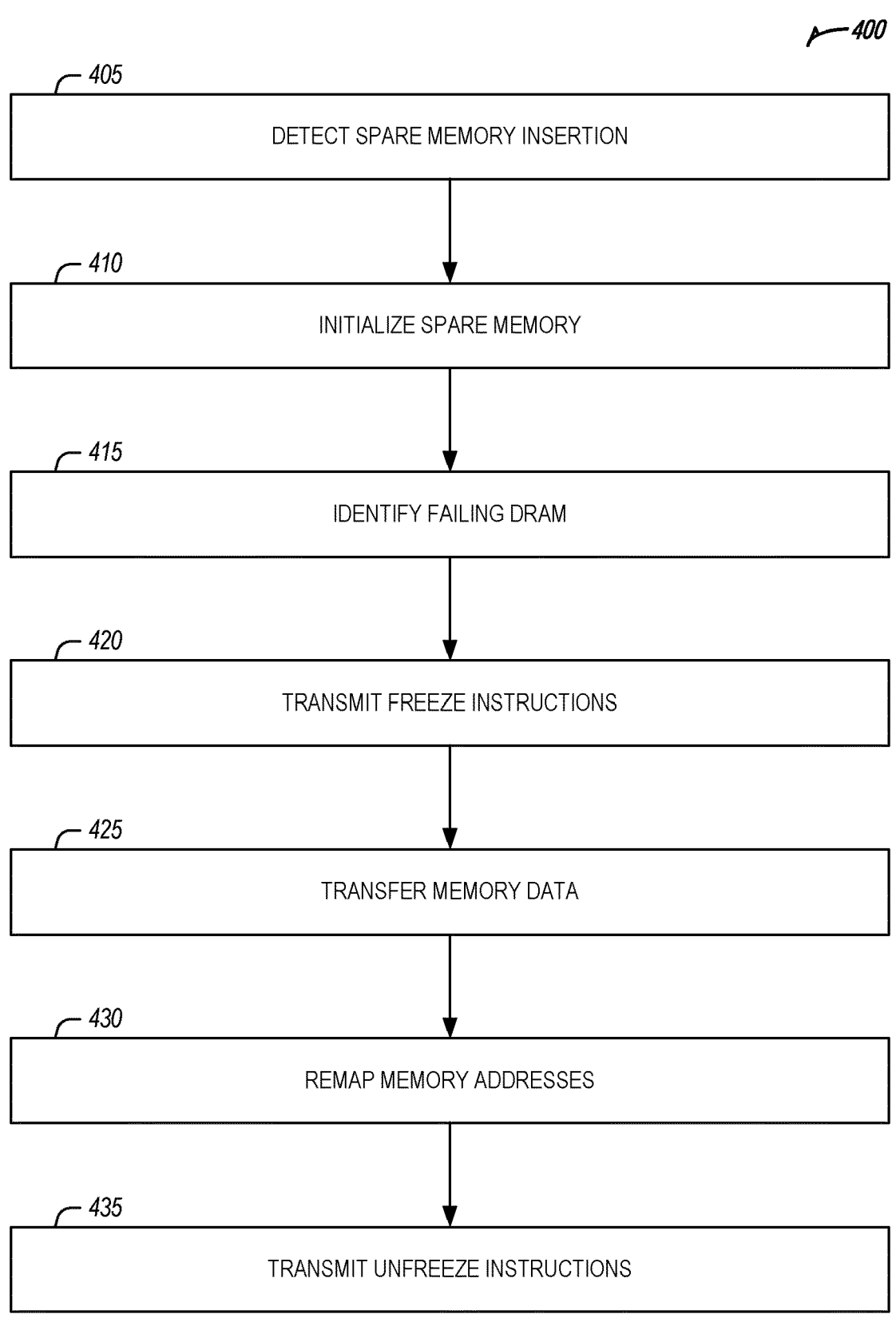
FIG. 4 illustrates an example of a method for live memory recovery using a pluggable memory module, according to an embodiment.

FIG. 4 illustrates an example of a method 400 for live memory recovery using a pluggable memory module, according to an embodiment. The method 400 may provide features as described in FIGS. 1 to 3.

A PFA agent (e.g., the PFA agent 118 as described in FIG. 1, etc.) determines that a DRAM module in a computing device (e.g., the computing node 102 as described in FIG. 1, etc.) is going to fail and a technician is notified of the predicted failure with identifying information of the DRAM module (e.g., a DRAM slot on a board of the computing device, etc.). The technician inserts a CXL spare pluggable memory module (e.g., the CSPMM 140 as described in FIG. 1, etc.) into a compatible interface of the computing device (e.g., a PCIe interface, etc.).

At operation 405, it is detected that a spare memory module (e.g., the CSPMM) has been inserted into a computing device based on a signal transmitted from the spare memory module (e.g., via the CXL channel 138A to the firmware agent 142, the BIOS 106, the CSPMM software agent 116 of the host OS 112, or a combination thereof). In an example, the spare memory module may be a peripheral component interlink express compatible device. The spare memory module may have a memory capacity at least equal to a capacity of the DRAM module and the spare memory module may include a set of compute express link instructions.

At operation 410, the spare memory module is initialized (e.g., by the host OS 112). For example, power is applied to the spare memory module and the spare memory module is allocated in an operating system of the node in which the spare memory module has been inserted making the spare memory module available for memory transfer. At operation 415, a dynamic random-access memory (DRAM) module of the computing device is identified that is predicted to fail (e.g., from the CXL repair component 150, etc.). In an example, the DRAM module may be predicted to fail by a predictive fault analysis agent. In an example, memory information may be obtained from firmware (e.g., the firmware agent 142, etc.) of the computing device. In an example, the firmware may be a system on chip firmware. The memory information may include an interleaved set of the DRAM module and details of a socket, slot, and channel of the DRAM module. A physical memory map may be obtained for the DRAM module and the DRAM module may be identified using the memory information and the physical memory map.

At operation 420, freeze instructions are transmitted (e.g., by the CSPMM software agent 116, etc.) to a virtual machine manager (e.g., the VMM 104, etc.) to pause virtual machines (e.g., the VMs 110) executing on the computing device. In an example, the freeze instructions to the virtual machine manager to pause the virtual machines executing on the computing device may include commands to place a core and input output processes in an idle state and to prevent memory traffic generation. In an example, freeze instructions place the memory in a deactivated state.

At operation 425, memory data is transferred from the DRAM module to the spare memory module (e.g., using the memory controller 128A, etc.). In an example, an interleaved set of the DRAM module may be mirrored to the spare memory module. At operation 430, memory addresses are remapped from the DRAM module to the spare memory module.

At operation 435, unfreeze instructions are transmitted (e.g., by the CSPMM software agent 116, etc.) to the virtual machine manager to resume the virtual machines executing on the computing device. In an example, the unfreeze instructions to the virtual machine manager to resume the virtual machines executing on the computing device may include commands to place a core and input output processes in an active state and to resume memory traffic generation. In an example, the unfreeze instruction place the memory in an active state.

Figure 5:
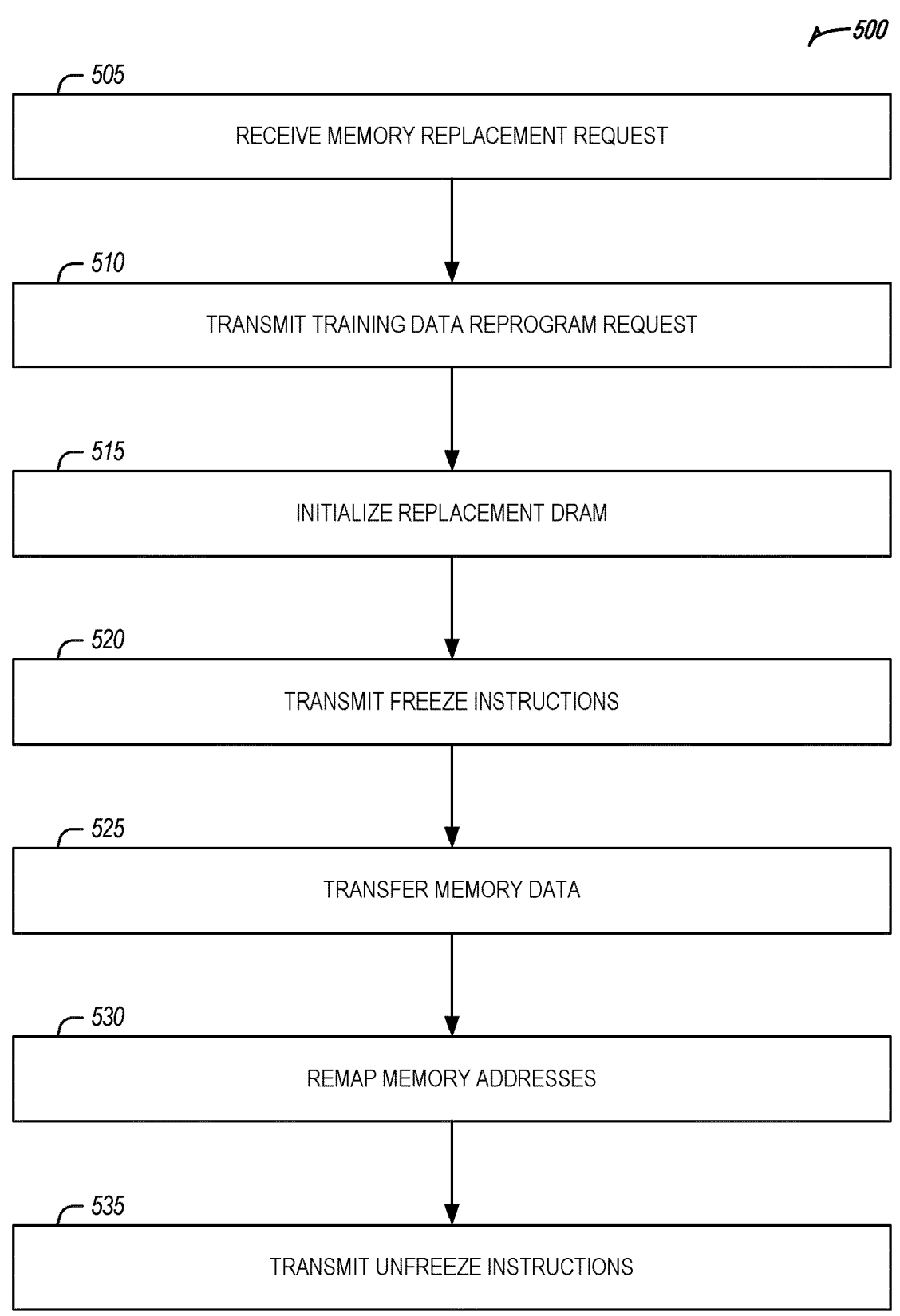
FIG. 5 illustrates an example of a method for live memory recovery using a pluggable memory module, according to an embodiment.

FIG. 5 illustrates an example of a method 500 for live memory recovery using a pluggable memory module, according to an embodiment. The method 500 may provide features as described in FIGS. 1 to 3.

At operation 505, a memory replacement initiation request is received. In an example, the memory replacement initiation request may be received from a computing device repair orchestration software agent via an out of band interconnect that facilitates communication between a board controller manageability device and the computing device.

At operation 510, a request is transmitted to firmware of the computing device to reprogram DRAM module memory training data to a replacement DRAM module. At operation 515, the replacement DRAM module inserted into the computing device is initialized using the DRAM module memory training data.

At operation 520, freeze instructions are transmitted to a virtual machine manager to pause virtual machines executing on the computing device. At operation 525, memory data is transferred from the spare memory module to the replacement DRAM module. At operation 530, memory addresses are remapped from the spare memory module to the replacement DRAM module.

At operation 535, unfreeze instructions are transmitted to the virtual machine manager to resume the virtual machines executing on the computing device. In an example, a shutdown request is transmitted to the spare memory module. The shutdown request places the spare memory module in a removable state. The technician then removes the spare memory module and the spare memory module may be reinserted into the computing device or another computing device when a subsequent DRAM failure is predicted. Thus, a single spare memory module may be used to service a plurality of computing devices within a data center.

Figure 6:
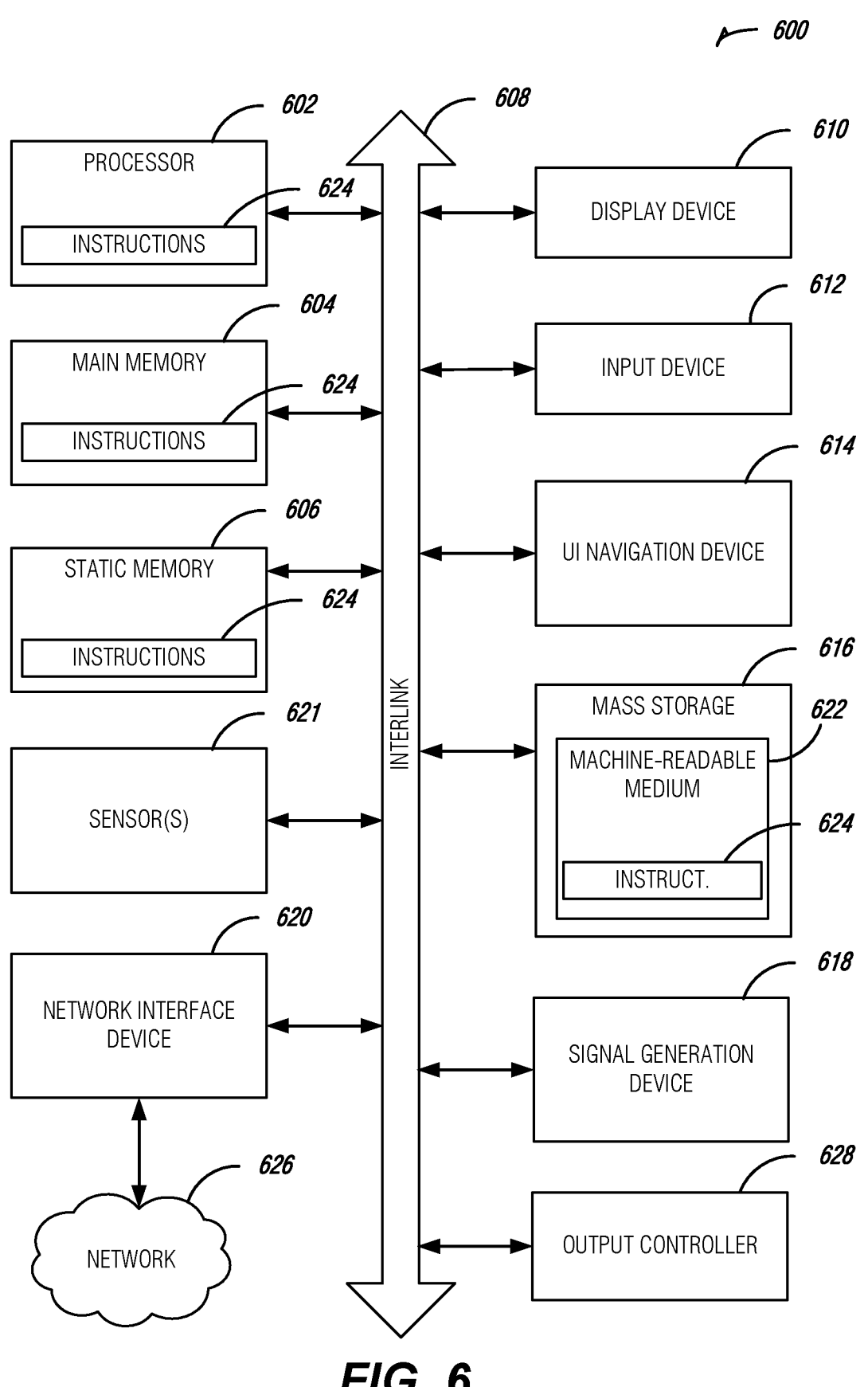
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g, hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a system for live dynamic random-access memory recovery comprising: at least one processor; and memory comprising instructions that, when executed by the at least one processor, cause the at least one processor to perform operations to: detect that a spare memory module has been inserted into a computing device based on a signal transmitted from the spare memory module; initialize the spare memory module; identify a dynamic random-access memory (DRAM) module of the computing device that is predicted to fail; transmit freeze instructions to a virtual machine manager to pause virtual machines executing on the computing device; transfer memory data from the DRAM module to the spare memory module; remap memory addresses from the DRAM module to the spare memory module; and transmit unfreeze instructions to the virtual machine manager to resume the virtual machines executing on the computing device.

In Example 2, the subject matter of Example 1 includes, the memory further comprising instructions that, when executed by the at least one processor, cause the at least one processor to perform operations to: obtain memory information from firmware of the computing device, wherein the memory information includes an interleaved set of the DRAM module and details of a socket, slot, and channel of the DRAM module; and obtain a physical memory map for the DRAM module, wherein the DRAM module is identified using the memory information and the physical memory map.

In Example 3, the subject matter of Example 2 wherein, the firmware is a system on chip firmware.

In Example 4, the subject matter of Examples 1-3 wherein, the freeze instructions to the virtual machine manager to pause the virtual machines executing on the computing device include commands to place a core and input output processes in an idle state and to prevent memory traffic generation.

In Example 5, the subject matter of Examples 1-4 wherein, the instructions to transfer the memory data from the DRAM module to the spare memory module further comprising instructions to mirror an interleaved set of the DRAM module to the spare memory module.

In Example 6, the subject matter of Examples 1-5 wherein, the unfreeze instructions to the virtual machine manager to resume the virtual machines executing on the computing device include commands to place a core and input output processes in an active state and to resume memory traffic generation.

In Example 7, the subject matter of Examples 1-6 includes, the memory further comprising instructions that, when executed by the at least one processor, cause the at least one processor to perform operations to: receive a memory replacement initiation request; transmit a request to firmware of the computing device to reprogram DRAM module memory training data to a replacement DRAM module; initialize the replacement DRAM module inserted into the computing device using the DRAM module memory training data; transmit the freeze instructions to the virtual machine manager to pause the virtual machines executing on the computing device; transfer memory data from the spare memory module to the replacement DRAM module; remap memory addresses from the spare memory module to the replacement DRAM module; and transmit the unfreeze instructions to the virtual machine manager to resume the virtual machines executing on the computing device.

In Example 8, the subject matter of Example 7 includes, the memory further comprising instructions that, when executed by the at least one processor, cause the at least one processor to perform operations to transmit a shutdown request to the spare memory module, wherein the shutdown request places the spare memory module in a removable state.

In Example 9, the subject matter of Examples 7-8 wherein, the memory replacement initiation request is received from a computing device repair orchestration software agent via an out of band interconnect that facilitates communication between a board controller manageability device and the computing device.

In Example 10, the subject matter of Examples 1-9 wherein, the spare memory module is a peripheral component interlink express compatible device, wherein the spare memory module comprises a memory capacity at least equal to a capacity of the DRAM module, and wherein the spare memory module comprises a set of compute express link instructions.

In Example 11, the subject matter of Examples 1-10 wherein, the DRAM module is predicted to fail by a predictive fault analysis agent.

Example 12 is a method for live dynamic random-access memory recovery comprising: detecting that a spare memory module has been inserted into a computing device based on a signal transmitted from the spare memory module; initializing the spare memory module; identifying a dynamic random-access memory (DRAM) module of the computing device that is predicted to fail; transmitting freeze instructions to a virtual machine manager to pause virtual machines executing on the computing device, transferring memory data from the DRAM module to the spare memory module; remapping memory addresses from the DRAM module to the spare memory module; and transmitting unfreeze instructions to the virtual machine manager to resume the virtual machines executing on the computing device.

In Example 13, the subject matter of Example 12 includes, obtaining memory information from firmware of the computing device, wherein the memory information includes an interleaved set of the DRAM module and details of a socket, slot, and channel of the DRAM module; and obtaining a physical memory map for the DRAM module, wherein the DRAM module is identified using the memory information and the physical memory map.

In Example 14, the subject matter of Example 13 wherein, the firmware is a system on chip firmware.

In Example 15, the subject matter of Examples 12-14 wherein, the freeze instructions to the virtual machine manager to pause the virtual machines executing on the computing device include commands to place a core and input output processes in an idle state and to prevent memory traffic generation.

In Example 16, the subject matter of Examples 12-15 wherein, transferring the memory data from the DRAM module to the spare memory module further comprises mirroring an interleaved set of the DRAM module to the spare memory module.

In Example 17, the subject matter of Examples 12-16 wherein, the unfreeze instructions to the virtual machine manager to resume the virtual machines executing on the computing device include commands to place a core and input output processes in an active state and to resume memory traffic generation.

In Example 18, the subject matter of Examples 12-17 includes, receiving a memory replacement initiation request; transmitting a request to firmware of the computing device to reprogram DRAM module memory training data to a replacement DRAM module; initializing the replacement DRAM module inserted into the computing device using the DRAM module memory training data; transmitting the freeze instructions to the virtual machine manager to pause the virtual machines executing on the computing device; transferring memory data from the spare memory module to the replacement DRAM module; remapping memory addresses from the spare memory module to the replacement DRAM module; and transmitting the unfreeze instructions to the virtual machine manager to resume the virtual machines executing on the computing device.

In Example 19, the subject matter of Example 18 includes, transmitting a shutdown request to the spare memory module, wherein the shutdown request places the spare memory module in a removable state.

In Example 20, the subject matter of Examples 18-19 wherein, the memory replacement initiation request is received from a computing device repair orchestration software agent via an out of band interconnect that facilitates communication between a board controller manageability device and the computing device.

In Example 21, the subject matter of Examples 12-20 wherein, the spare memory module is a peripheral component interlink express compatible device, wherein the spare memory module comprises a memory capacity at least equal to a capacity of the DRAM module, and wherein the spare memory module comprises a set of compute express link instructions.

In Example 22, the subject matter of Examples 12-21 wherein, the DRAM module is predicted to fail by a predictive fault analysis agent.

Example 23 is at least one non-transitory machine-readable medium comprising instructions for live dynamic random-access memory recovery that, when executed by at least one processor, cause the at least one processor to perform operations to. detect that a spare memory module has been inserted into a computing device based on a signal transmitted from the spare memory module; initialize the spare memory module; identify a dynamic random-access memory (DRAM) module of the computing device that is predicted to fail; transmit freeze instructions to a virtual machine manager to pause virtual machines executing on the computing device; transfer memory data from the DRAM module to the spare memory module, remap memory addresses from the DRAM module to the spare memory module; and transmit unfreeze instructions to the virtual machine manager to resume the virtual machines executing on the computing device.

In Example 24, the subject matter of Example 23 includes, instructions that, when executed by the at least one processor, cause the at least one processor to perform operations to: obtain memory information from firmware of the computing device, wherein the memory information includes an interleaved set of the DRAM module and details of a socket, slot, and channel of the DRAM module; and obtain a physical memory map for the DRAM module, wherein the DRAM module is identified using the memory information and the physical memory map.

In Example 25, the subject matter of Example 24 wherein, the firmware is a system on chip firmware.

In Example 26, the subject matter of Examples 23-25 wherein, the freeze instructions to the virtual machine manager to pause the virtual machines executing on the computing device include commands to place a core and input output processes in an idle state and to prevent memory traffic generation.

In Example 27, the subject matter of Examples 23-26 wherein, the instructions to transfer the memory data from the DRAM module to the spare memory module further comprising instructions to mirror an interleaved set of the DRAM module to the spare memory module.

In Example 28, the subject matter of Examples 23-27 wherein, the unfreeze instructions to the virtual machine manager to resume the virtual machines executing on the computing device include commands to place a core and input output processes in an active state and to resume memory traffic generation.

In Example 29, the subject matter of Examples 23-28 includes, instructions that, when executed by the at least one processor, cause the at least one processor to perform operations to: receive a memory replacement initiation request; transmit a request to firmware of the computing device to reprogram DRAM module memory training data to a replacement DRAM module; initialize the replacement DRAM module inserted into the computing device using the DRAM module memory training data, transmit the freeze instructions to the virtual machine manager to pause the virtual machines executing on the computing device; transfer memory data from the spare memory module to the replacement DRAM module; remap memory addresses from the spare memory module to the replacement DRAM module; and transmit the unfreeze instructions to the virtual machine manager to resume the virtual machines executing on the computing device.

In Example 30, the subject matter of Example 29 includes, instructions that, when executed by the at least one processor, cause the at least one processor to perform operations to transmit a shutdown request to the spare memory module, wherein the shutdown request places the spare memory module in a removable state.

In Example 31, the subject matter of Examples 29-30 wherein, the memory replacement initiation request is received from a computing device repair orchestration software agent via an out of band interconnect that facilitates communication between a board controller manageability device and the computing device.

In Example 32, the subject matter of Examples 23-31 wherein, the spare memory module is a peripheral component interlink express compatible device, wherein the spare memory module comprises a memory capacity at least equal to a capacity of the DRAM module, and wherein the spare memory module comprises a set of compute express link instructions.

In Example 33, the subject matter of Examples 23-32 wherein, the DRAM module is predicted to fail by a predictive fault analysis agent.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is a method to implement of any of Examples 1-33.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for live dynamic random-access memory recovery comprising:

at least one processor; and memory comprising instructions that, when executed by the at least one processor, cause the at least one processor to perform operations to:

detect that a spare memory module has been inserted into a hot-pluggable interface of a computing device that is in an operational state based on a signal transmitted from logic contained in the spare memory module upon insertion into the hot-pluggable interface, wherein the hot-pluggable interface enables power on of the spare memory module upon insertion subsequent to an initial boot sequence of the computing device, and wherein the signal is transmitted upon power on of the spare memory module;

initialize the spare memory module;

receive an indication of a predicted failure of a dynamic random-access memory (DRAM) module of the computing device, the indication received before actual failure of the DRAM module;

transmit freeze instructions to a virtual machine manager to pause virtual machines executing on the computing device;

transfer memory data from the DRAM module to the spare memory module;

remap memory addresses from the DRAM module to the spare memory module; and transmit unfreeze instructions to the virtual machine manager to resume the virtual machines executing on the computing device.

2. The system of claim 1, the memory further comprising instructions that, when executed by the at least one processor, cause the at least one processor to perform operations to:

obtain memory information from firmware of the computing device, wherein the memory information includes an interleaved set of the DRAM module and details of a socket, slot, and channel of the DRAM module; and obtain a physical memory map for the DRAM module, wherein the DRAM module is identified using the memory information and the physical memory map.

3. The system of claim 1, wherein the freeze instructions to the virtual machine manager to pause the virtual machines executing on the computing device include commands to place a core and input output processes in an idle state and to prevent memory traffic generation.

4. The system of claim 1, the instructions to transfer the memory data from the DRAM module to the spare memory module further comprising instructions to mirror an interleaved set of the DRAM module to the spare memory module.

5. The system of claim 1, wherein the unfreeze instructions to the virtual machine manager to resume the virtual machines executing on the computing device include commands to place a core and input output processes in an active state and to resume memory traffic generation.

6. The system of claim 1, the memory further comprising instructions that, when executed by the at least one processor, cause the at least one processor to perform operations to:

receive a memory replacement initiation request;

transmit a request to firmware of the computing device to reprogram DRAM module memory training data to a replacement DRAM module;

initialize the replacement DRAM module inserted into the computing device using the DRAM module memory training data;

transmit the freeze instructions to the virtual machine manager to pause the virtual machines executing on the computing device;

transfer memory data from the spare memory module to the replacement DRAM module;

remap memory addresses from the spare memory module to the replacement DRAM module; and transmit the unfreeze instructions to the virtual machine manager to resume the virtual machines executing on the computing device.

7. The system of claim 6, the memory further comprising instructions that, when executed by the at least one processor, cause the at least one processor to perform operations to transmit a shutdown request to the spare memory module, wherein the shutdown request places the spare memory module in a removable state.

8. The system of claim 6, wherein the memory replacement initiation request is received from a computing device repair orchestration software agent via an out of band interconnect that facilitates communication between a board controller manageability device and the computing device.

9. The system of claim 1, wherein the spare memory module is a peripheral component interlink express compatible device, wherein the spare memory module comprises a memory capacity at least equal to a capacity of the DRAM module, and wherein the spare memory module comprises a set of compute express link instructions.

10. A method for live dynamic random-access memory recovery comprising:

detecting that a spare memory module has been inserted into a hot-pluggable interface of a computing device that is in an operational state based on a signal transmitted from logic contained in the spare memory module upon insertion into the hot-pluggable interface, wherein the hot-pluggable interface enables power on of the spare memory module upon insertion subsequent to an initial boot sequence of the computing device, and wherein the signal is transmitted upon power on of the spare memory module;

initializing the spare memory module;

receiving an indication of a predicted failure of a dynamic random-access memory (DRAM) module of the computing device, the indication received before actual failure of the DRAM module;

transmitting freeze instructions to a virtual machine manager to pause virtual machines executing on the computing device;

transferring memory data from the DRAM module to the spare memory module;

remapping memory addresses from the DRAM module to the spare memory module; and transmitting unfreeze instructions to the virtual machine manager to resume the virtual machines executing on the computing device.

11. The method of claim 10, further comprising:

obtaining memory information from firmware of the computing device, wherein the memory information includes an interleaved set of the DRAM module and details of a socket, slot, and channel of the DRAM module; and obtaining a physical memory map for the DRAM module, wherein the DRAM module is identified using the memory information and the physical memory map.

12. The method of claim 10, further comprising:

receiving a memory replacement initiation request;

transmitting a request to firmware of the computing device to reprogram DRAM module memory training data to a replacement DRAM module;

initializing the replacement DRAM module inserted into the computing device using the DRAM module memory training data;

transmitting the freeze instructions to the virtual machine manager to pause the virtual machines executing on the computing device;

transferring memory data from the spare memory module to the replacement DRAM module;

remapping memory addresses from the spare memory module to the replacement DRAM module; and transmitting the unfreeze instructions to the virtual machine manager to resume the virtual machines executing on the computing device.

13. The method of claim 12, further comprising transmitting a shutdown request to the spare memory module, wherein the shutdown request places the spare memory module in a removable state.

14. The method of claim 10, wherein the spare memory module is a peripheral component interlink express compatible device, wherein the spare memory module comprises a memory capacity at least equal to a capacity of the DRAM module, and wherein the spare memory module comprises a set of compute express link instructions.

15. At least one non-transitory machine-readable medium comprising instructions for live dynamic random-access memory recovery that, when executed by at least one processor, cause the at least one processor to perform operations to:

detect that a spare memory module has been inserted into a hot-pluggable interface of a computing device that is in an operational state based on a signal transmitted from logic contained in the spare memory module upon insertion into the hot-pluggable interface, wherein the hot-pluggable interface enables power on of the spare memory module upon insertion subsequent to an initial boot sequence of the computing device, and wherein the signal is transmitted upon power on of the spare memory module;

initialize the spare memory module;

receive an indication of a predicted failure of a dynamic random-access memory (DRAM) module of the computing device, the indication received before actual failure of the DRAM module;

transmit freeze instructions to a virtual machine manager to pause virtual machines executing on the computing device;

transfer memory data from the DRAM module to the spare memory module;

remap memory addresses from the DRAM module to the spare memory module; and transmit unfreeze instructions to the virtual machine manager to resume the virtual machines executing on the computing device.

16. The at least one non-transitory machine-readable medium of claim 15, further comprising instructions that, when executed by the at least one processor, cause the at least one processor to perform operations to:

obtain memory information from firmware of the computing device, wherein the memory information includes an interleaved set of the DRAM module and details of a socket, slot, and channel of the DRAM module; and obtain a physical memory map for the DRAM module, wherein the DRAM module is identified using the memory information and the physical memory map.

17. The at least one non-transitory machine-readable medium of claim 15, the instructions to transfer the memory data from the DRAM module to the spare memory module further comprising instructions to mirror an interleaved set of the DRAM module to the spare memory module.

18. The at least one non-transitory machine-readable medium of claim 15, further comprising instructions that, when executed by the at least one processor, cause the at least one processor to perform operations to:

receive a memory replacement initiation request;

transmit a request to firmware of the computing device to reprogram DRAM module memory training data to a replacement DRAM module;

initialize the replacement DRAM module inserted into the computing device using the DRAM module memory training data;

transmit the freeze instructions to the virtual machine manager to pause the virtual machines executing on the computing device;

transfer memory data from the spare memory module to the replacement DRAM module;

remap memory addresses from the spare memory module to the replacement DRAM module; and transmit the unfreeze instructions to the virtual machine manager to resume the virtual machines executing on the computing device.

19. The at least one non-transitory machine-readable medium of claim 18, further comprising instructions that, when executed by the at least one processor, cause the at least one processor to perform operations to transmit a shutdown request to the spare memory module, wherein the shutdown request places the spare memory module in a removable state.

20. The at least one non-transitory machine-readable medium of claim 15, wherein the spare memory module is a peripheral component interlink express compatible device, wherein the spare memory module comprises a memory capacity at least equal to a capacity of the DRAM module, and wherein the spare memory module comprises a set of compute express link instructions.

*   *   *   *   *